US006184168B1

(12) United States Patent
Lynch (10) Patent No.: US 6,184,168 B1
(45) Date of Patent: Feb. 6, 2001

(54) SYNTHESIS OF 1,4-TRANS-POLYBUTADIENE USING A LANTHANIDE ORGANIC ACID SALT CATALYST

(75) Inventor: Thomas J. Lynch, Akron, OH (US)

(73) Assignee: Bridgestone Corporation, Tokyo (JP)

( * ) Notice: Under 35 U.S.C. 154(b), the term of this patent shall be extended for 0 days.

(21) Appl. No.: 09/467,683

(22) Filed: Dec. 21, 1999

Related U.S. Application Data (62) Division of application No. 08/934,608, filed on Sep. 22, 1997, now Pat. No. 6,018,007.

(51) Int. Cl.⁷ .................................................. B01J 31/12
(52) U.S. Cl. .................... 502/102; 502/150; 502/152; 502/154; 502/155; 502/157; 502/168
(58) Field of Search .................... 502/102, 150, 502/152, 154, 155, 157, 168

(56) References Cited

U.S. PATENT DOCUMENTS

| | | |
|---|---|---|
| 3,493,892 | 2/1970 | Witteman et al. . |
| 3,948,593 | 4/1976 | Moore et al. ............................ 431/8 |
| 4,429,089 | 1/1984 | Pedretti et al. ...................... 561/153 |
| 4,619,982 * | 10/1986 | Jenkins ................................. 526/164 |
| 4,689,368 | 8/1987 | Jenkins ................................. 525/247 |
| 4,931,376 | 6/1990 | Ikematsu et al. ..................... 526/164 |
| 4,990,573 | 2/1991 | Andreussi et al. ................ 525/332.3 |
| 5,104,950 * | 4/1992 | Martin et al. ......................... 526/129 |
| 5,109,085 * | 4/1992 | Pettijohn et al. ..................... 526/160 |
| 5,159,022 | 10/1992 | Takeshi et al. ....................... 525/250 |
| 5,245,019 * | 9/1993 | Conroy et al. ......................... 534/15 |
| 5,350,816 * | 9/1994 | Pettijohn .............................. 526/114 |
| 5,463,000 | 10/1995 | Miyoshi et al. ...................... 526/119 |
| 5,492,983 * | 2/1996 | Olonde et al. .......................... 526/64 |
| 5,567,784 | 10/1996 | Wieder et al. ........................ 561/164 |
| 5,610,114 | 3/1997 | Robert et al. ......................... 502/115 |
| 5,612,427 | 3/1997 | Robert et al. ....................... 526/124.9 |
| 5,627,119 * | 5/1997 | Biagini et al. ........................ 502/152 |
| 5,659,101 | 8/1997 | Biagini et al. ........................ 585/601 |
| 5,686,371 * | 11/1997 | Ansell et al. ......................... 502/102 |
| 5,707,913 * | 1/1998 | Schlund et al. ...................... 502/102 |

FOREIGN PATENT DOCUMENTS

| | | |
|---|---|---|
| 1 525 381 | 9/1978 | (GB) . |
| 1 531 085 | 11/1978 | (GB) . |
| 2 029 426 | 3/1980 | (GB) . |
| 2 070 034 | 9/1981 | (GB) . |
| 2-60907 | 3/1990 | (JP) . |

OTHER PUBLICATIONS

English Abstract of Japanese Patent No. 02 60907 (Asahi Chemical Industry Co.) Mar. 1999.

"A Rare Earth Catalyst for Diene Polymerization Based on Butyl Lithium", by Jenkins, *Polymer*, vol. 33, No. 1, pp. 156–160 (1992), No Month Available.

"Synthesis of Polydienes of Controlled Tacticity with New Catalytic Systems" by Mazzei, *Makromol. Chem. Suppl. 4*, pp. 61–72 (1981), No Month Available.

* cited by examiner

*Primary Examiner*—Elizabeth D. Wood
(74) *Attorney, Agent, or Firm*—David G. Burleson; Arthur M. Reginelli (57) ABSTRACT

The invention provides a catalyst composition, comprising: (a) an organolithium compound; and, (b) an organic acid salt of lanthanide series element; wherein: (1) only components (a) and (b) are required to promote the synthesis of 1,4-trans-polybutadiene; (2) the ratio of component (a) to component (b) is selected to maximize formation of the trans structure of said 1,4-trans-polybutadiene; and, (3) components (a) and (b) are selected for enabling further diblock synthesis. The invention further contemplates a process for using the catalyst to synthesize 1,4-trans-polybutadiene and other polymers and copolymers having trans configuration in the conjugated diene monomer contributed units.

19 Claims, 1 Drawing Sheet

Figure 1

SYNTHESIS OF 1,4-TRANS-POLYBUTADIENE USING A LANTHANIDE ORGANIC ACID SALT CATALYST

This application of a divisional application of U.S. Pat. application Ser. No. 08/934,608 filed on Sep. 22, 1997, now U.S. Pat. No. 6,018,007.

FIELD OF THE INVENTION

The instant invention broadly relates to catalysts used in the promotion of organic chemical reactions with a catalyst. More specifically, the invention relates to the use of a catalyst composition comprising a metallo-organic salt of a lanthanide element for promoting a polymerization synthesis which produces synthetic polymers from conjugated diene monomers. Still more specifically, the invention relates to the addition of a catalytically effective combination of two components: (1) an organic acid salt of a lanthanum series compound, and (2) an organolithium compound, for promoting the chemical synthesis of 1,4-trans-polybutadiene, while having further utility in the synthesis of diblock polymers.

BACKGROUND OF THE INVENTION

This invention relates to the polymerization of conjugated diene monomers using a catalyst system containing a compound of a rare earth element, i.e. an element having an atomic number of 57 to 71 inclusive.

Use of lanthanide series catalysts in the synthesis of 1,4-trans-polybutadiene is known in the prior art. For instance U.S. Pat. No. 4,619,982 to Jenkins, discloses the use of various catalyst systems containing rare earth compounds for the polymerization of conjugated diene monomers, in recent years. Examples of such disclosures are (1) Mazzei A., Makromol. Chem. Suppl. 4 61 (1981); (2) Witte J., Angew. Makromol. Chem. 94 119 (1981); (3) Shen Tse-Chuan et al, J. Pol. Sci. Polym. Chem. Ed. 18 3345 (1980); (4) Marwede G. and Sylvester G., Trans. 22nd Annual Proceedings of the International Institute of Synthetic Rubber Producers, Madrid Paper III-3 (1981). Such catalyst systems have two or three components, for example a lanthanoid alkyl, alkoxide or salt (e.g. neodymium tricarboxylate) with an organoaluminium compound and optionally a Lewis Acid. When a -allyl complex of a rare earth such as Ln(allyl) dioxane, where Ln also a lanthanide element, is used which gives a polymer of predominantly trans 1,4 content, and which needs no cocatalyst. Such -allyl catalysts are described in the paper by Mazzei referred to above and appear to proceed by an ionic mechanism.

One embodiment of the Jenkins invention discloses a two component catalyst for the homo polymerization of a conjugated diene or the copolymerization of a conjugated diene with one or more other conjugated dienes comprising (a) a salt of a rare earth element or a complex of a rare earth element and (b) an organo magnesium compound. The Jenkins invention also includes the use of a catalyst, as just defined, in the homo polymerization of a conjugated diene. Surprisingly, Jenkins found that the product of such a polymerization employing an organo magnesium compound as cocatalyst is a conjugated diene polymer having a very high content of trans isomer. The rare earth element in component (a) of the catalyst of are those having an atomic number of 57 (lanthanum) to 71 (lutetium). However, the polymerization activity of certain of these elements, e.g. samarium or europium, is known to be low. Thus, a compound of cerium, praseodymium, neodymium, gadolinium, terbium or dysprosium is preferred by Jenkins. A compound of two or more rare earth elements may be used. A compound of neodymium or "didymium" (which is a mixture of rare earth elements containing approximately 72% neodymium, 20% lanthanum and 8% praseodymium) is preferred. Preferably component (a) is soluble in hydrocarbon polymerization medium, examples being the carboxylates, alkoxides and diketones. Examples of compounds for use as component (a) are "didymium" versatate (derived from versatic acid, a synthetic acid composed of a mixture of highly branched isomers of $C_{10}$ monocarboxylic acids, sold by Shell Chemicals), praseodymium (2,2,6,6-tetramethyl-3,5-heptane dione). "Didymium" and especially neodymium "versatate" are preferred on the grounds of ready solubility, ease of preparation and stability. Component (b) of the catalyst is an organo magnesium compound. Dihydrocarbyl magnesium compounds of formula $R_2$ Mg where each R, which may be the same or different, is for example, an alkyl (including cycloalkyl), aryl, aralkyl, allyl or cyclodiene group. Dialkyl magnesium compounds, where each alkyl group has from 1 to 10 carbon atoms, are preferred. Magnesium dibutyl was particularly preferred by Jenkins on the grounds of ease of availability. The organo magnesium compound may also be a hydrocarbon soluble Grignard reagent of formula RMgX where R is a hydrocarbyl group such as exemplified above and X is chlorine, bromine or iodine. The molar ratio of component (a) to component (b) was preferably 0.01:1 to 0.5:1 more preferably 0.06:1 to 0.3:1. Absolute concentration of component (b) may be for example, 1 to 5 millimoles per hundred grams of polymerisable monomer. Similarly in the publication *Polymer*, 1985, 26, p147, D. K. Jenkins disclosed experiments wherein high trans polybutadiene was obtained by using a catalyst system comprising a rare earth compound plus a magnesium dialkyl. The polymer appeared to contain some "live" chain ends.

In another U.S. Pat. No. 4,931,376, to Ikematsu et al, another process for the homopolymerization of a high-trans polybutadiene is described. Ikematsu provides a process for producing crystalline trans-butadiene polymers. The process comprises: using a complexed catalyst comprising (a) an organic acid salt of lanthanum or cerium and (b) an organic magnesium compound as the essential components. Lanthanum and cerium which are the main components in the complexed catalyst of the Ikematsu invention are metals occurring abundantly among lanthanide transition metals (rare earth metals) and commercially readily available at relatively low cost. Ikematsu unexpectedly found that a conjugated diene can be polymerized by using the complexed catalyst of the present invention to provide a conjugated diene polymer having high trans content at a very high activity, and yet the polymer obtained has a high molecular weight and a narrow molecular weight distribution, containing substantially no gel, the polymer thus obtained exhibiting excellent workability and physical properties. The organic acid salt of lanthanum or cerium which is the component (a) in the complexed catalyst of the present invention can readily be obtained by, for example, making an alkali metal salt of an organic acid as shown below to react with a chloride of lanthanum or cerium in water or an organic solvent such as alcohols, ketones, etc. The organic acid salt of lanthanum or cerium may contain inorganic salts of lanthanum or cerium or organic acids as the impurities in small amounts.

Various lanthanide series catalysts are known by the prior art. For instance, see: J. Am. Chem. Soc., vol. 104, pp. 6571–6473 (1982), Patricia L. Watson and D. Christopher Roe, "Beta-Alkyl Transfer in a Lanthanide Model for Chain Termination;" J. Am. Chem. Soc., vol. 107, pp. 8091–8103 (1985), Gerald Jeske, Harald Lauke, Heiko Mauermann, Paul N. Swepston, Herbert Schumann and Tobin J. Marks, "Highly Reactive Organolanthanides. Systematic Routes to and Olefin Chemistry of Early and Late Bis (pentamethylcyclopentadienyl) 4f Hydrocarbyl and Hydride Complexes." Also exemplary in displaying the utility of lanthanide series compounds in catalyst systems for the production synthetic rubbers is U.S. Pat. No. 4,152,295 teaching the reaction of a conjugated diolefin with at least one compound selected from the group consisting of a carboxylic acid and a carboxylic acid anhydride in the presence of oxygen and a catalyst comprising a rare earth metal compound, an alkali metal compound and a halide compound.

U.S. Pat. No. 4,461,883 teaches a process for producing a conjugated diene polymer, characterized by polymerizing at least one conjugated diene with a catalyst consisting of: (A) a reaction product of a Lewis base and a carboxylate of a rare earth element of the lanthanum series represented by $Ln(R_1CO_2)_3$ wherein Ln is a rare earth element of the lanthanum series having an atomic number of 57 to 71 and R1 is a hydrocarbon substituent having 1 to 20 carbon atoms; (B) an organic aluminum compound represented by $AlR^2R^3R^4$ wherein $R^2$, $R^3$ and $R^4$, which may be identical or different, represent hydrogen atoms or hydrocarbon substituents having 1 to 8 carbon atoms, excluding the case where all of $R^2$, $R^3$ and $R^4$ are hydrogen atoms at the same time; and, (C) an (alkyl)aluminum halide represented by $AlX_nR^5_{3-n}$ wherein X is Cl, Br, F or I; $R^5$ is a hydrocarbon substituent having 1 to 8 carbon atoms; and n has a value of 1, 1.5, 2 or 3, or consisting of these (A), (B) and (C) components and (D) a conjugated diene. A polymer obtained by the process has a high cis-1,4-configuration content and is excellent in physical properties of vulcanizate.

U.S. Pat. No. 5,612,427 teaches a supported solid catalyst which can be used for the polymerization and copolymerization of conjugated dienes. The basis of the catalyst is the reaction product of: A) a solid $MgCl_2$ support; B) an ether, preferably THF, as swelling agent for the support; C) a metal salt selected from among metals having an atomic number of between 57 and 71 or 92 in the periodic table of elements and, if the metal salt is not a halide; D) a halogenation agent selected from the group consisting of a halogenated compound of aluminum and a halogenated compound not containing aluminum, the reaction solid being free from the swelling agent; plus, E) an organic derivative of aluminum which is obligatory when the halogenation agent is not a halogenated compound of aluminum and optional when the halogenation agent is a derivative of aluminum.

U.S. Pat. No. 4,696,984 teaches isoprene polymers and copolymers which are prepared by a polymerization process carried out in the absence of solvents and in the presence of a catalytic system comprising (a) at least one element or compound of an element pertaining to Group IIIB of the Periodic Table, (b) at least one aluminum alkyl derivative, (C) at least one organic halogen derivative or at least one halide of an element able to exist in at least two valency states with the halide corresponding to a higher state than the minimum, or at least one halogen or at least one hydrogen halide acid, (d) at least one compound containing one or more hydroxyl groups of which the hydrogen can be substituted, the ratio of component (b) to component (a) being equal to or less than 20.

U.S. Pat. No. 5,610,114 teaches a supported solid catalyst which can be used for the polymerization and copolymerization of conjugated dienes. The basis of the catalyst is the reaction product of: A) a solid $MgCl_2$ support; B) an ether, preferably THF, as swelling agent for the support; C) a metal salt selected from among metals having an atomic number of between 57 and 71 or 92 in the periodic table of elements and, if the metal salt is not a halide; D) a halogenation agent selected from the group consisting of a halogenated compound of aluminum and a halogenated compound not containing aluminum, the reaction solid being free from the swelling agent; plus, E) an organic derivative of aluminum which is obligatory when the halogenation agent is not a halogenated compound of aluminum and optional when the halogenation agent is a derivative of aluminum.

U.S. Pat. No. 5,567,784 teaches the production of diene rubbers polymerized by means of Nd catalysts. The rubbers have a reduced cold flow and a low intrinsic odor. The process is effected by the polymerization of diolefines adiabatically at temperatures of –20° to 150° C., in the presence of inert organic solvents and in the presence of metallo-organic mixed catalysts based on neodymium carboxylate. The reaction mixture obtained in this manner is depressurized, and thereafter treated with disulphur dichloride, sulphur dichloride and/or thionyl chloride sufficient to impart the desired properties.

U.S. Pat. No. 4,990,573 teaches the processability of a polybutadiene with a high content of 1,4-cis-structure which is improved by means of the addition of $PCl_3$ before the polymerization reaction is quenched and when Mooney viscosity of polybutadiene has reached a prefixed value, preferably lower than, or equal to 30; the polymerization of butadiene is carried out in a solution in an aliphatic or cycloaliphatic solvent, in the presence of a catalytic system based on rare earths, preferably a neodymium-based catalytic system.

U.S. Pat. No. 4,429,089 teaches a method for the polymerization or copolymerization of butadiene or isoprene conducted in the presence of a catalytic system composed of: (A) an aluminum trialkyl having the formula, $AlR_3$; wherein R is an alkyl radical containing from 1 to 20 carbon atoms, (B) an aluminum halide or alkyl aluminum halide having the formula $AlX_aR_{3-a}$; wherein R is an alkyl radical containing from 1 to 20 carbon atoms, X is chlorine or bromine and a is an integer from 1 to 3, and (C) Neodymium alcoholate having the formula, $Nd(OR)_3$; wherein R is an alkyl radical containing from 1 to 20 carbon atoms. In one embodiment, the present invention comprises a two component catalyst for the homo polymerization of a conjugated diene while providing the option of a block polymerization of a conjugated diene with one or more other conjugated dienes. The two component catalyst or the invention comprises (a) a salt of a rare earth element or a complex of a rare earth element and (b) an organo magnesium compound. The invention also includes the use of a catalyst, as just defined, in the homo polymerization of a conjugated diene or the block polymerization of a conjugated diene with one or more other conjugated dienes. Surprisingly the product of such a polymerization employing an organo magnesium compound as cocatalyst is a conjugated diene polymer having a very high content of trans isomer. The present invention contrasts with the two or three component rare-earth-containing prior art systems, referred to above, which use an organo aluminum compound as cocatalyst and which, as already mentioned, yield a product having a high content of cis isomer.

However, none of the prior art catalyst systems combines all of the advantages of: requiring only two component catalyst system which requires relatively less costly components to vary the microstructure of the polymer product, while nonetheless providing the option of diblock synthesis. Thus, a long felt need has hitherto existed for such a catalyst system.

SUMMARY OF THE INVENTION

It is the object of the instant invention to provide a new and improved catalyst system and method of synthesizing 1,4 trans-polybutadiene, which provides at least some of the advantages of the prior art schemes, while simultaneously eliminating at least some of the disadvantages of them.

It is another object of the instant invention to provide a new and improved catalyst system which can be manufactured at correspondingly lower cost with regard to both labor and materials, and which accordingly can be sold at a correspondingly lower cost, thus promoting commerce.

It is a further object of the instant invention to provide a new and improved catalyst system which is particularly designed for accommodating the synthesis of 1,4 trans-polybutadiene having a substantially improved trans conversion.

Other objects, features, and advantages of the instant invention, in its details of formulation and manufacture, will be seen from the above, from the following description of the preferred embodiment when considered in light of the appended claims.

DETAILED DESCRIPTION OF THE INVENTION

The invention relates to the addition of a catalytically effective combination of two components: (1) an organic acid salt of a lanthanide series compound, and (2) an alkyllithium compound, and their use in a process for promoting the chemical synthesis of 1,4-trans-polybutadiene and has further utility in the synthesis of diblock polymers. Although the catalyst system of the instant invention contemplates more than two catalyst components, only two are required.

The catalyst system of the present invention includes as one of the components a rare earth compound, normally used in the polymerization of conjugated dienes, and preferably soluble or dispersible in aliphatic hydrocarbons, cycloaliphatic hydrocarbons and aromatic hydrocarbons, preferably hexane.

The rare earth compound in the catalyst system contain a rare earth element (Ln) in the lanthanide series having an atomic number of 57 to 71, and lanthanum, cerium, praseodymium, neodymium and gadolinium are preferred, and lanthanum is particularly preferable for the preparation of 1,4-trans-polybutadiene. Alternatively, the Ln may be a mixture of two or more rare earth elements. When such a mixture is used, at least 30% by weight of lanthanum or neodymium is preferred.

The lanthanum rare earth catalysts of the present invention are any complexes of a metal belonging to the series of the lanthanides having an atomic number of 57 to 71, in which a ligand is directly bound to the metal and is a monovalent and monodentate organic radical including but not limited to: (—$R^1CO_2$), (—$OR^1$), (—$NR^1R^2$), (—$SR^1$), (—$PR^1R^2$)), [—$OP(O)(O\ R)_2$] and [—$OS(O)_2R$], wherein R, $R^1$ and $R^2$ are independently selected from alkyl, cycloalkyl and aryl hydrocarbon substituents having 1 to 20 carbon atoms. Suitable lanthanum rare earth compounds to be treated are represented by the following structures: $Ln(R^1CO_2)_3$, $Ln(OR^1)_3$, $LN(NR^1R^2)_3$, $Ln(SR^1)_3$, $Ln(PR^1R^2)_3$, $Ln[OP(O)(OR^1)(OR^2)]_3$, and $Ln[OS(O)_2R]_3$, wherein Ln is a rare earth element in the lanthanum series having an atomic number of 57 to 71 and R, $R^1$ and $R^2$ are alkyl, cycloalkyl and aryl hydrocarbon substituents, or combinations thereof, having 1 to 20 carbon atoms. More specifically, R, $R^1$ and $R^2$ may also be independently selected from the group including: cycloalkylalkyl, alkylcycloalkyl, aryl, alkylaryl substitutents and combinations thereof. Even more specifically R, $R^1$ and $R^2$ may be independently selected from the group including: methyl, ethyl, n-propyl, isopropyl, n-butyl, isobutyl, t-butyl, n-anyl, isoamyl, n-hexyl, n-octyl, n-decyl, 2-ethyl hexyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl and combinations thereof.

Other ligands contemplated by the instant invention are organic compounds represented by the formulae (I) to (VIII) as shown below:

(I)

(II)

(III)

(IV)

(V)

(VI)

(VII)

(VIII)

wherein each of $R^3$, $R^4$ and $R^7$–$R^{10}$ represents an aliphatic hydrocarbon group or an aromatic hydrocarbon group, $R^5$ an aromatic hydrocarbon group, $R^6$ an aliphatic hydrocarbon group, each of $R^{11}$–$R^{14}$ an aliphatic hydrocarbon group, an aromatic hydrocarbon group, an alkoxy group or a phenoxy group, L an oxygen atom or a sulfur atom, and j, k, l and m are integers of 1 to 6.

The above formula (I) represents alcohols, thioalcohols, phenols or thiophenols. Examples of these may include methyl alcohol, ethyl alcohol, n-propyl alcohol, iso-propyl alcohol, tert-butyl alcohol, tert-amyl alcohol, n-hexyl alcohol, cyclohexyl alcohol, aryl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-iso-butanethiol, thiophenol, 2-naphthalenthiol, cyclohexane-thiol, 3-methylcyclohexanethiol, 2-naphthalenethiol, benzenemethanethiol, 2-naphthalenemethanethiol and the like.

The formula (II) represents carboxylic acids or sulfur analogues thereof. Examples of these may include isovaleric acid, caprylic acid, octanoic acid, lauric acid, myristic acid, palmitic acid, stearic acid, oleic acid, linoleic acid, cyclopentanecarboxylic acid, napthenic acid, ethylhexanoic acid, pivalic acid, Versatic Acid (synthetic acid constituted of a mixture of isomers of $C_{10}$ mono-carboxylic acids sold by Shell Chemical Co.), phenylacetic acid, benzoic acid, 2-naphthoic acid, hexanethionic acid, 2,2-dimethylbutanethionic acid, tetradecanethionic acid, thiobenzoic acid and the like.

The formula (III) represents alkyl aryl sulfonic acids, as exemplified by dodecylbenzenesulfonic acid, tetradecylbenzenesulfonic acid, hexadecylbenzenesulfonic acid, octadecylbenzenesulfonic acid, dibutylnaphthalenesulfonic acid, n-hexylylnaphthalenesulfonic acid, dibutylphenylsulfonic acid and the like.

The formula (IV) represents mono-alcohol esters of sulfuric acid, such as sulfuric acid mono-ester of lauryl alcohol, sulfuric acid mono-ester of oleyl alcohol, sulfuric acid mono-ester of stearyl alcohol and the like.

The formula (V) represents phosphate diesters of ethylene oxide adduct of alcohol or phenol. Examples of these may include phosphate diester of ethylene oxide adduct of dodecyl alcohol, phosphate diester of ethylene oxide adduct of octyl alcohol, phosphate diester of ethylene oxideadduct of stearyl alcohol, phosphate diester of ethylene oxide adduct of oleyl alcohol, phosphate diester of ethylene oxide adduct of nonylphenol, phosphate diester of ethylene oxide adduct of dodecyl-phenol and the like.

The formula (VI) represents phosphite diesters of ethylene oxide adduct of alcohol or phenol. Examples of these may include phosphite diester of ethylene oxide adduct of dodecyl alcohol, phosphite diester of ethylene oxide adduct of stearyl alcohol, phosphite diester of ethylene oxide adduct of oleyl alcohol, phosphite diester of ethylene oxide adduct of nonylphenol, phosphite diester of ethylene oxide adduct of dodecylphenol and the like.

The formula (VII) represents pentavalent organic phosphoric acid compounds, including, for example, dibutyl phosphate, dipentyl phosphate, dihexyl phosphate, diheptyl phosphate, dioctyl phosphate, bis(1-methylheptyl) phosphate, bis(2-ethyl-hexyl) phosphate, dilauryl phosphate, dioleyl phosphate, diphenyl phosphate, bis(p-nonylphenyl) phosphate, butyl(2-ethylhexyl) phosphate, (1-methylheptyl) (2-ethylhexyl) phosphate, (2-ethylhexyl) (p-nonylphenyl) phosphate, monobutyl(2-ethylhexyl) phosphonate, mono-2-ethylhexyl(2-ethylhexyl) phosphonate, mono-2-ethylhexyl phenyl phosphonate, mono-p-nonylphenyl(2-ethylhexyl) phosphonate, dibutylphosphinic acid, bis(2-ethylhexyl) phosphinic acid, bis(1-methylheptyl)phosphinic acid, dilaurylphosphinic acid, dioleylphosphinic acid, diphenylphosphinic acid, bis(p-nonylphenyl)phosninic acid, butyl(2-ethyhexyl)phosphinic acid, (2-ethylhexyl) (1-methyl-heptyl)phosphinic acid, (2-ethylhexyl) (p-nonylphenyl)phosphinic acid and the like.

The formula (VIII) represents trivalent phosphorous acid compounds, as exemplified by bis(2-ethylhexyl) phosphite, bis(1-methylheptyl) phosphite, bis(2-ethylhexyl) phosphinous acid and the like.

Still more specifically, the lanthanum rare earth catalysts of the present invention include but are not necessarily limited to: lanthanum tris(nonylphenoxide), lanthanum tris (dodecyl-p-toluene sulfonate), lanthanum tris[bis(2-ethylhexyl)phosphate], lanthanum tris[dipropylamine], lanthanum tris[propylthio], lanthanum tris[propoxyl], lanthanum propionate, lanthanum diethylacetate, lanthanum 2-ethyl hexanoate, lanthanum stearate, lanthanum benzoate, cerium benzoate, praseodymium propionate, praseodymium cyclohexane carboxylate, praseodymium 2-ethyl hexanoate, neodymium diethyl acetate, neodymium 2-ethyl hexanoate, neodymium cyclohexane carboxylate, neodymium stearate, neodymium oleate and neodymium benzoate. Of the foregoing, lanthanum tris(nonylphenoxide) is the most preferred.

The organolithium catalysts contemplated by the instant invention include but are not necessarily limited to lithium compounds having the general formula $R(Li)_x$, wherein R represents a hydrocarbyl radical of 1 to 20, preferably 2 to 8, carbon atoms per R group and x is an integer from 1 to 4. Specific example of other suitable lithium catalysts include: p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines, 1,3,3-trilithio-1-octyne, 1,1,3-trilithio-1,2-butadiene and the like. The preferred catalyst for use in the present invention are n-butyllithium, t-butyllithium and sec-butyllithium.

The synthesis is carried out in hydrocarbon reaction diluent, for example, hexane, cyclohexane or toluene. It is very desirable that the catalyst components are soluble in the particular reaction diluent used. An aliphatic solvent, e.g. hexane, or cycloaliphatic solvent, e.g. cyclohexane, or toluene are preferred. Hexane is most preferred.

The lanthanide compound and the organolithium catalysts are added to the reaction mass in a hydrocarbon diluent at a relative molar ratio within the range of from about 1:0.1 to about 1:100.0; more preferably from about 1:1.0 to about 1:50.0; still more preferably about 1:2.0 to about 1:10.0; and most preferably about 1:3.0.

A reaction temperature of about 0° to about 120° C., is typical; while about 20° C. to about 100° C. is preferred. In order to compensate for the vapor pressure of the monomer (s) under typical reaction conditions, reaction pressures of from about slightly above atmospheric to up to about 10 atmospheres are preferred. Generally the molecular weight of the polymer is inversely proportional to catalyst concentration. Molecular weight generally also increases in direct proportion to polymerization time. This suggests that at least a portion of the catalyst system remains active throughout the reaction time.

Examples of conjugated diene monomers which may be block polymerized by the process of the invention are butadiene and isoprene although the process is not restricted to the use of one or other of these two conjugated dienes. Mixtures of conjugated dienes may be used if desired. The preferred order of addition of catalyst components is to add the monomer to the solvent first followed by component (a) and then component (b) and, if used, finally component (c) in that order.

It is particularly beneficial, and thus preferred, to carry out the polymerization using components (a) and (b) together in the presence of a polar diluent, typically a Lewis base such as tetrahydrofuran. Exemplary of other polar compounds are (a) ethers such as dimethyl ether, diethyl ether, 1,2 dimethoxy ethane, diphenyl ether, dibenzyl ether and anisole; (b) amines such as trimethylamine, triethylamine pyridine or tetra methyl ethylene diamine; (c) thioethers such as thiophene and (d) polyethers such as glyme or diglyme. These polar compounds are well known in the art. Their use in the present invention enables higher conversions of monomer to polymer to be obtained with no appreciable effect on trans content unless very high concentrations of these polar compounds are used. Typical of such high concentrations is a molar ration of polar compound to compound (b) of greater than about 2.5:1. Surprisingly addition of a polar compound produces no increase in vinyl content of the polymer, in contrast to the increase in vinyl content such compounds produce in anionic polymerizations.

As can be seen from the above the process of the invention offers the possibility of preparing a wide variety of conjugated diene polymers (1) a polymer of high trans 1,4 content, by using components (a) and (b); (2) a block polymer having a high trans block and a second block, by initiating the polymerization using components (a) and (b) alone and adding a cis 1,4 component at the desired degree of conversion. Some homopolymer of high trans content and high cis content respectively may also be formed in this reaction; and, (4) a polymer of medium trans 1,4 content e.g. 50–80% by modification of the reaction using components (a) and (b) with lithium alkyl; optionally carrying out the polymerization in the presence of a vinyl aromatic monomer, such as styrene, to obtain e.g. a styrene-butadiene copolymer of medium trans 1,4 content.

These polymers are rubbery (except the polymers of high trans content) and may be compounded and vulcanized by methods well known in the art. They are of potential application in tires, general rubber goods and in the preparation of plastics materials such as high impact polystyrene.

The instant invention is preferably directed to the synthesis of 1,4 trans-butadiene polymer. However, the versatile two-component catalyst system, nonetheless provides the option of block polymerization to further modify the primary product to include other desirable properties such as improved softening temperature, moldability, rigidity, strength, resilience, impact resistance, and the like. However, the full significance of the present invention is demonstrated through a polymer resin product which contains at least 30 weight % of the initial trans-polybutadiene product.

Other particularly preferable polymeric resin components that may be mixed with the initial trans-butadiene product include, but are not necessarily limited to: trans-isoprene polymers, trans-polyoctenamers and caprolactone polymers. In order to modify the hardness or plasticity of crystalline trans-butadiene polymers compositions of the present invention, inorganic fillers or plasticizers may be added, as desired. Similarly, conventional stabilizers, pigments, and the like may be added in any manner and for any purpose prescribed by the prior art.

Inorganic fillers are typically added in amounts of about 5 to about 100 parts by weight per 100 parts by weight of the polymeric resin component. Such fillers include, but are not limited to: titanium oxide, silica, calcium carbonate, clay, talc, mica, bentonite, and the like. The addition of fillers beyond these specified amounts have been observed to adversely lower the impact strength of the polymeric resin product.

Plasticizers are typically added in amounts ranging from about 1 to 20 parts by weight per 100 parts by weight of the polymeric resin product. Examples of plasticizers may include, but are not necessarily limited to: dibutyl phthalate, di-(2-ethylhexyl) phthalate, di-(2-ethylhexyl) adipate, diethylene glycol benzoate, butyl stearate, butylepoxy stearate, tri-(2-ethylhexyl) phosphate, and the like.

The polymeric resin product of the present invention can easily be mixed by means of an extruder, a kneader, rolls, or the like. These apparatuses are typically operated at temperature ranges from about 60° to about 200° C.; and, preferably from about 80° to 180° C. It is also possible to mix the components in a solution dissolved in a suitable solvent.

Polymeric resin product of the instant invention that contains crystalline trans-butadiene polymers may generally be used without vulcanization. However, depending uses such as golf ball cover materials, and the like, it is typically preferable to impart further strength and impact resistance to the polymeric resin product through vulcanization. Although, any conventional method of vulcanization can be used for this purpose, it is preferable to vulcanize a trans-butadiene product of the instant invention at temperatures no higher than the melting point of the product. Exemplary of these methods, are low temperature vulcanization and electron beam vulcanization.

Preferred vulcanizing agents used in low temperature vulcanization include, but are not necessarily limited to: elemental sulfur, selenium, tellurium, inorganic sulfur compounds such as sulfur dichloride, sulfur chloride, etc.; organic sulfur compounds such as morpholine disulfide, alkylphenol disulfide, and the like. Typical vulcanization accelerators include, but are not necessarily limited to: guanidine type vulcanization accelerators, aldehyde-ammonia type vulcanization accelerators, sulphenamide type vulcanization accelerators, thiuram type vulcanization accelerators, xanthate type vulcanization accelerators, aldehyde-amine type vulcanization accelerators, thiazole type vulcanization accelerators, thiourea type vulcanization accelerators, dithiocarbamate type vulcanization accelerators and mixed types of these. The particularly preferred vulcanizing agent is elemental sulfur. It is preferably used in an amount of about 0.1 to about 3.0 parts by weight per 100 parts by weight of the polymer. Preferred vulcanization accelerators include, but are not necessarily limited to: xanthate type vulcanization accelerators and dithiocarbamate type vulcanization accelerators. Examples of xanthate type vulcanization accelerators include, but are not necessarily limited to: sodium isopropylxanthate, zinc isopropylxanthate, zinc ethylxanthate, zinc butylxanthate, dibutylxanthate disulfide, and the like. Examples of preferred dithiocarbamate type vulcanization accelerators include, but are necessarily limited to: sodium dimethyldithicarbamate, sodium diethyldithiocarbamate, sodium di-n-butyldithiocarbamate, zinc ethylphenyldithiocarbamate, zinc dimethyldithiocarbamate, zinc diethyldithiocarbamate, zinc di-n-butyldithiocarbamate, zinc dibenzylthiocarbamate, zinc N-penta-methylenedithiocarbamate, zinc dimethylpentamethylenedithio-carbamate, zinc ethylphenyldithiocarbamate, selenium dimethyldithiocarbamate, selenium diethyldithiocarbamate, tellurium diethyldithiocarbamate, cadmium diethyldithiocarbamate, dimethylammonium dimethyldithiocarbamate, dibutylammonium dibutyldithiocarbamate, diethylamine diethyldithiocarbamate, N,N'-dimethylcyclohexane salt of dibutyldithiocarbamic acid, pipecolic methylpentamethylenedithiocarbamate, and the like. Depending on the particular vulcanization accelerator employed, preferred amounts of accelerator typically range from about 0.1 to about 3.0 parts by weight per 100 parts by weight of the polymer. It is generally preferable to conduct the vulcanization at temperatures below about 90° C. Particularly preferable are vulcanization temperature in the range of about 30° to 60° C. Vulcanization times, which may differ depending on the vulcanizing agent, the vulcanization accelerator and the vulcanization temperature; may generally be from about some ten minutes to about several days.

The crystalline trans-polybutadienes produced by the present invention are excellent in moldability and workability at relatively lower temperatures and also exhibit excellent physical properties such as rigidity, strength, resilience, impact resistance, and the like. These polymers are used in the formulation of rubber compounds to increase green strength and improve processability. The trans-polybutadienes are also used in the preparation plastic materials such as high impact polystyrene.

The instant invention will be described in more detail with reference to the following non-limitative examples. The following examples are present for purposes of illustration only and are be construed in a limiting sense. All percentages are by weight unless otherwise specified.

EXAMPLE 1

An oven dried, 750 ml glass bottle was sealed with a butyl liner and crown cap. The bottle was cooled then charged with 223 grams of a dry butadiene/hexane blend (22.3 wt %). Lanthanum tris[2-ethylhexyl) phosphate] (0.27 mmol) was added to the monomer solution. This was followed by the addition of η-BuLi (1.08 mmol). The bottle was placed in a 65° C. water bath for 2 hours. The solvent was then allowed to evaporate yielding a white powder. The isolated yield was 87%. The analysis of this material is reported in Table 1.

salts were used. These examples are summarized in Table 1 along with the corresponding results. These results show that a variety of lanthanum salts are suitable for the preparation of an active catalyst system.

EXAMPLES 5 TO 13

Examples 5 to 13, reactions similar to that described for Example 1 were carried out while the ratio of catalyst to monomer was varied. The results of these examples are summarized in Table 2. These results show that the molecular weight can be controlled by the ratio of catalyst to monomer.

TABLE 2

| Example | mM La phg Bd | Li/La | Yield (%) | Mn (kg/mol) | Mw/Mn | Tm(1) (° C.) | Tm(2) (° C.) |
| --- | --- | --- | --- | --- | --- | --- | --- |
| Ligand: bis(2-ethylhexyl)phosphate | | | | | | | |
| 5 | 0.35 | 4.00 | 78 | 73 | 1.44 | 47 | 91 |
| 6 | 0.45 | 4.00 | 87 | 65 | 1.41 | 48 | 91 |
| 7 | 0.55 | 4.00 | 87 | 52 | 1.37 | 49 | 93 |
| 8 | 0.65 | 4.00 | 93 | 41 | 1.46 | 48 | 91 |
| Ligand: nonylphenoxide | | | | | | | |
| 9 | 0.30 | 3.5 | 87 | 107 | 1.81 | 42 | 61 |
| 10 | 0.45 | 3.5 | 90 | 77 | 1.47 | 39 | 54 |
| 11 | 0.60 | 3.5 | 94 | 59 | 1.44 | 37 | 49 |
| 12 | 0.75 | 3.5 | 98 | 47 | 1.26 | 16 | 37 |
| 13 | 0.90 | 3.5 | 96 | 37 | 1.31 |  | 39 |

EXAMPLES 14 TO 19

Examples 14 to 19, diethylzinc was added to the butadiene solution prior to the addition of n-BuLi. The polymerizations were run in a similar manner to that described for Example 1. The amounts of the catalyst components used

TABLE 1

| Example | Ligand | mM La phg Bd | Li/La | Pzn Temp (° C.) | Pzn Time (hrs) | Yield (%) | Mn (kg/mol) | Mw/Mn | 1,4-trans (%) | 1,2-vinyl (%) | Tm(1) (° C.) | Tm(2) (° C.) |
| --- | --- | --- | --- | --- | --- | --- | --- | --- | --- | --- | --- | --- |
| 1 | a | 0.55 | 4 | 65 | 2.0 | 87 | 52 | 1.37 |  |  | 49 | 93 |
| 2 | b | 1.00 | 3.8 | 50 | 2.15 | 67 | 36 | 1.21 | 88 | 6 | 49 | 90 |
| 3 | c | 1.20 | 3.1 | 50 | 1.10 | 87 | 37 | 1.11 | 92 | 4 | 47 | 95 |
| 4 | c | 0.60 | 3 | 50 | 2.30 | 91 | 70 | 1.27 | 92 | 4 | 48 | 91 | a: bis(2-ethylhexyl)phosphate
b: dodecylbenzenesulfonate
c: nonylphenoxide

EXAMPLES 2 TO 4

Examples 2 to 4, reactions similar to that described for Example 1 were carried out in which different lanthanum and the results from these polymerizations are listed in Table 3. It is apparent from these results that diethylzinc can be used to lower the molecular weight and narrow the polydispersity of the polymer.

TABLE 3

| EXAMPLE | mM La phg Bd | Li/La | Zn/La | Yield (%) | Mn (kg/mol) | Mw/Mn | 1,4-trans (%) | 1,2-vinyl (%) | Tm(1) (° C.) | Tm(2) (° C.) |
| --- | --- | --- | --- | --- | --- | --- | --- | --- | --- | --- |
| Ligand: bis(2-ethylhexyl)phosphate | | | | | | | | | | |
| 14 | 0.25 | 4 | 0.5 | 46 | 58 | 1.61 | 94 | 4 | 49 | 93 |
| 15 | 0.25 | 4 | 1 | 42 | 47 | 1.47 | 95 | 4 | 47 | 92 |
| 16 | 0.25 | 4 | 3 | 52 | 40 | 1.33 |  |  | 47 | 93 |

TABLE 3-continued

| EXAMPLE | mM La phg Bd | Li/La | Zn/La | Yield (%) | Mn (kg/mol) | Mw/Mn | 1,4-trans (%) | 1,2-vinyl (%) | Tm(1) (° C.) | Tm(2) (° C.) |
|---|---|---|---|---|---|---|---|---|---|---|
| 17 | 0.35 | 4 | 0.5 | 61 | 52 | 1.48 | 95 | 4 | 50 | 93 |
| 18 | 0.35 | 4 | 1 | 63 | 47 | 1.40 | 96 | 4 | 48 | 93 |
| 19 | 0.35 | 4 | 3 | 61 | 34 | 1.30 | 95 | 4 | 47 | 92 |

EXAMPLES 20 TO 23

In Examples 20 to 23 polymerizations were carried out in which the ratio of catalyst components was varied. These polymerizations were carried out in a manner similar to that described for Example 1. The conditions used for these polymerizations are summarized in Table 4. The results from these examples indicate that the microstructure of the polymers can be controlled by varying the ratio of the catalyst components.

TABLE 4

| Example | mM La phg Bd | Li/La | Pzn Temp (° C.) | Pzn Time (hrs) | Yield (%) | Mn (kg/mol) | Mw/Mn | 1,4-trans (%) | 1,2-vinyl (%) | Tm(1) (° C.) | Tm(2) (° C.) | Tg (° C.) |
|---|---|---|---|---|---|---|---|---|---|---|---|---|
| | | | | | Ligand: bis(2-ethylhexyl)phosphate | | | | | | | |
| 20 | 0.50 | 3 | 60 | 1:30 | 95 | 64 | 1.30 | 92 | 5 | 48 | 85 | |
| 21 | 0.60 | 3.5 | 60 | 1:30 | 95 | 64 | 1.29 | 91 | 5 | 47 | 84 | |
| 22 | 0.60 | 4 | 60 | 1:30 | 92 | 50 | 1.18 | 79 | 7 | 15 | 39 | −83 |
| 23 | 0.60 | 4.5 | 60 | 1:30 | 95 | 42 | 1.11 | 64 | 10 | | −25 | −91 |

EXAMPLES 24 TO 27

Figure 1:
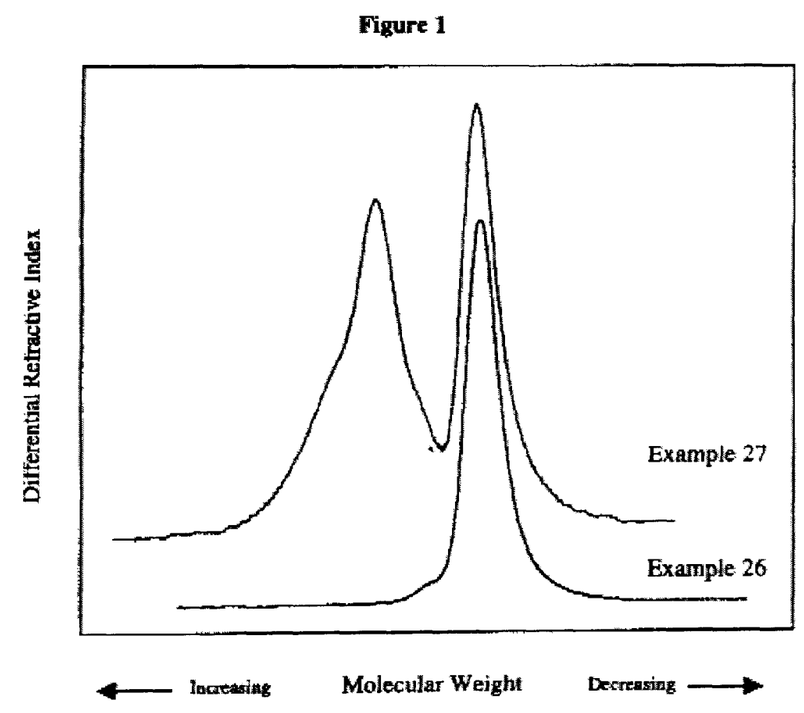
FIG. 1 displays the comparison between the polymer product of the Examples 26 and Example 27 (tin coupled).

In Examples 24 to 27, two sets of polymerizations were carried out in a similiar manner to that described in Example 1. Within each set, one polymerization was terminated with isopropanol and the other with tin tetrachloride. The amounts of catalyst and tin tetrachloride used are shown in Table 5. The effect of SnCl$_4$ termination on the molecular weight distribution of the polymer is shown in FIG. 1. It is clear from these SEC chromatograms that the addition of tin tetrachloride causes a coupling reaction to occur. The percent coupled polymer was estimated from the SEC chromatograms. These results establish the "living" nature of the polymerization, that is, this behavior is consistent with a polymer molecule that retains a reactive chain end after the monomer has been consumed by the polymerization reaction. This data is similar to the results that are obtained with a butyllithium polymerization, typically known as a "living" system. Therefore the results of FIG. 1 suggest that much of the synthetic strategies that have been used in the BuLi system, such as the synthesis of block polymers, could also be considered with the Ln/BuLi system.

Those of ordinary skill in the art will appreciate that the conception upon which this disclosure is based may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

I claim:

1. A catalyst composition that is the combination or reaction product of ingredients consisting essentially of:
   (a) an organolithium compound; and
   (b) an organic acid salt of lanthanide series element.

TABLE 5

| Example | mM La phg Bd | Li/La | Sn−Cl / Li | Pzn Temp (° C.) | Pzn Time (hrs) | Yield (%) | Mw (kg/mol) | Mw/Mn | coupled (%) | 1,4-trans (%) | 1,2-vinyl (%) | Tm(1) (° C.) | Tm(2) (° C.) |
|---|---|---|---|---|---|---|---|---|---|---|---|---|---|
| | | | | | | Ligand: bis(2-ethylhexyl)phosphate | | | | | | | |
| 24 | 0.75 | 4 | 0 | 65 | 1.5 | 84 | 51 | 1.45 | 0 | | | 47 | 89 |
| 25 | 0.75 | 4 | 0.7 | 65 | 1.0 | 84 | 131 | 2.59 | 48 | | | 49 | 87 |
| | | | | | | Ligand: nonylphenoxide | | | | | | | |
| 26 | 1.20 | 3.1 | 0 | 50 | 1:10 | 87 | 41 | 1.11 | 0 | 92 | 4 | 47 | 95 |
| 27 | 1.20 | 3.1 | 1 | 50 | 1:10 | 85 | 113 | 1.91 | 55 | 90 | 5 | 48 | 95 |

2. The catalyst composition of claim 1, wherein said composition consists essentially of catalytically effective amounts of (a) n-butyl lithium and (b) lanthanum tris (nonylphenoxide).

3. The catalyst composition of claim 2, wherein component (b) is a compound having a general formula selected from the group consisting of $Ln(R^1CO_2)_3$, $Ln(OR^1)_3$, $Ln(NR^1R^2_2)_3$, $Ln(SR^1)_3$, $Ln(PR^1R^2)_3$, $Ln[OP(O)(OR^1)(OR^2)]_3$ and $Ln(OS(O)_2R_3$, wherein Ln is a rare earth element in the lanthanum series having an atomic number of 57 to 71 and R, $R^1$ and $R^2$ are independently selected from the group of substituents consisting of alkyl, cycloalkyl and aryl hydrocarbon substituents having 1 to 20 carbon atoms.

4. The catalyst composition of claim 3, wherein R, $R^1$ and $R^2$ are independently selected from the group of substitutents consisting of cycloalkylalkyl, alkylcycloalkyl, aryl, alkylaryl and combinations thereof.

5. The catalyst composition of claim 1, wherein R, $R^1$ and $R^2$ may also be independently selected from the group of substitutents consisting of methyl, ethyl, n-propyl, isopropyl, n-butyl, isobutyl, t-butyl, n-amyl, isoamyl, n-hexyl, n-octyl, n-decyl, 2-ethyl hexyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl and combinations thereof.

6. The catalyst composition of claim 2, wherein the catalyst component (b) is the reaction product of a compound containing a lanthanide series element and an organic compound defined by one of the following formulae (I) to (VIII)

wherein each of $R^3$, $R^4$, $R^7$ and $R^{10}$ represents an aliphatic hydrocarbon group or an aromatic hydrocarbon group, $R^5$ an aromatic hydrocarbon group, $R^6$ an aliphatic hydrocarbon group, each of $R^{11}$ and $R^{14}$ an aliphatic hydrocarbon group, an aromatic hydrocarbon group, an alkoxy group or a phenoxy group, L an oxygen atom or a sulfur atom, and j, k, l and m are integers of 1 to 6; and, combinations thereof.

7. The catalyst composition of claim 3, wherein Ln is selected from the group consisting of lanthanum, cerium, praseodymium, neodymium, gadolinium and combinations thereof.

8. The catalyst composition of claim 3 wherein Ln is a mixture comprising at least 30% by weight of lanthanum or neodymium.

9. The catalyst composition of claim 3 wherein component (b) is lanthanum tris(nonylphenoxide).

10. The catalyst composition of claim 2, wherein compound (a) comprises a lithium compound having the general formula $R(Li)_x$, wherein R represents a hydrocarbyl radical of 1 to 20 carbon atoms per R group and x is an integer from 1 to 4.

11. The catalyst composition of claim 10, wherein component (a) is selected from the group consisting of p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines, 1,3,3-trilithio-1-octyne, 1,1,3-trilithio-1,2-butadiene and combinations thereof.

12. The catalyst composition of claim 11, wherein component (a) is selected from the group consisting of n-butyllithium, sec-butyllithium and t-butyllithium and combinations thereof.

13. The catalyst composition of claim 1, where the molar ratio of component (b) to component (a) is from about 1:1.0 to about 1:50.0.

14. A catalyst composition formed by the process comprising the steps of:
  combining ingredients consisting essentially of:
    (a) an organolithium compound; and
    (b) an organic acid salt of lanthanide series element.

15. A composition that is the reaction product or combination of ingredients consisting essentially of:
  (a) an organolithium compound;
  (b) an organic acid salt of lanthanide series element;
  (c) 1,3-butadiene; optionally
  (d) diethylzinc; and optionally
  (e) a polar diluent.

16. The catalyst composition of claim 1, where the catalyst composition consists of (a) and (b).

17. The catalyst composition of claim 14, where the ingredients consists of (a) and (b).

18. The catalyst composition of claim 1, where the molar ratio of component (b) to component (a) is from about 1:2.0 to about 1:10.0.

19. The catalyst composition of claim 14, where the molar ratio of component (b) to component (a) is from about 1:2.0 to about 1:10.0.

* * * * *

UNITED STATES PATENT AND TRADEMARK OFFICE
CERTIFICATE OF CORRECTION

PATENT NO. : 6,184,168 B1
DATED : February 6, 2001
INVENTOR(S) : Lynch

It is certified that error appears in the above-identified patent and that said Letters Patent is hereby corrected as shown below:

Column 15, claim 3,
Line 4, "$Ln(Nr^1R^2{}_3$" should be -- $Ln(Nr^1R^2)_3$ --.
Line 5, "$Ln(OS(O)_2R_3$" should be -- $Ln(OS(O)_2R)_3$ --.

Column 15, claim 5,
Line 13, "The catalyst composition of claim 1" should be -- The catalyst composition of claim 4 --.

Column 15, claim 6,
Line 51, the following formulae should be added:

(VI)

(VII)

(VIII)

UNITED STATES PATENT AND TRADEMARK OFFICE
CERTIFICATE OF CORRECTION

PATENT NO. : 6,184,168 B1
DATED : February 6, 2001
INVENTOR(S) : Lynch

It is certified that error appears in the above-identified patent and that said Letters Patent is hereby corrected as shown below:

<u>Column 16, claim 8,</u>
Line 7, "The catalyst composition of claim 3" should be -- The catalyst composition of claim 7 --.

Signed and Sealed this

Eleventh Day of December, 2001

*Attest:*

NICHOLAS P. GODICI
*Attesting Officer           Acting Director of the United States Patent and Trademark Office*